United States Patent

Laugner

[11] Patent Number: 6,141,795
[45] Date of Patent: *Oct. 31, 2000

[54] COMMUNICATION SYSTEM

[75] Inventor: Armin Laugner, Nürnberg, Germany

[73] Assignee: U.S. Philips Corporation, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/990,871

[22] Filed: Dec. 15, 1997

[30] Foreign Application Priority Data

Dec. 18, 1996 [DE] Germany .......................... 196 52 628

[51] Int. Cl.$^7$ ...................................................... G06F 9/445
[52] U.S. Cl. ................................................. 717/11; 717/10
[58] Field of Search ................................... 395/712, 710; 717/11

[56] References Cited

U.S. PATENT DOCUMENTS

| | | | |
|---|---|---|---|
| 4,788,637 | 11/1988 | Tamaru | 395/200.51 |
| 4,954,941 | 9/1990 | Redman | 395/712 |
| 5,155,847 | 10/1992 | Kirouac et al. | 395/200.51 |
| 5,430,877 | 7/1995 | Naylor | 395/712 |
| 5,778,234 | 7/1998 | Hecht et al. | 395/712 |
| 5,787,288 | 7/1998 | Nagata et al. | 395/712 |
| 5,901,320 | 5/1999 | Takahashi et al. | 395/712 |
| 5,909,581 | 6/1999 | Park | 395/712 |
| 5,974,454 | 10/1999 | Apfel et al. | 709/221 |
| 5,978,916 | 11/1999 | Randall | 713/200 |
| 6,014,725 | 1/2000 | Kind et al. | 711/103 |

FOREIGN PATENT DOCUMENTS

4333272A1 6/1995 Germany .......................... H04M 1/00

*Primary Examiner*—Tariq R. Hafiz
*Assistant Examiner*—Ted T. Vo
*Attorney, Agent, or Firm*—Jack D. Slobod

[57] ABSTRACT

A communication system is composed of a terminal unit (1) which includes a control circuit (5) and at least two non-volatile rewritable memories (6, 7) for storing software, and a station (2) for supplying new version software to the terminal unit to replace old version software currently stored in the two memories. The station has a control circuit (5) which is configured for exchanging software contained in at least one memory (6, 7) of the station in response to an exchange command. The software includes at least first and second blocks which are stored each in a different non-volatile memory (6, 7) of the terminal, the first software block containing specific functions for use during an exchange operation, and the second block not containing specific functions for use during an exchange operation. During an exchange operation the control circuit (5) of the terminal is configured for replacing a stored old version second software block with a received new version first software block, and thereafter replacing a stored old version first software block by a received new version second software block.

14 Claims, 2 Drawing Sheets

COMMUNICATION SYSTEM

BACKGROUND OF THE INVENTION

The invention relates to a communication system comprising a terminal unit which includes a control circuit and at least two memories for storing software, and comprising a station for supplying software to the terminal unit whose control circuit is provided for exchanging software contained in at least one memory in response to an exchange command.

Such a communication system is known from DE 43 33 272 A1 which discusses a terminal unit coupled to a network and a maintenance device. The maintenance device sends new process software for a control circuit of the terminal unit over the network, which operating software is exchanged in the terminal unit by means of an exchange control unit included in the control circuit. The exchange control unit utilizes exchange software for the exchange operation, which software is stored in an exchange memory. The system software is stored in another memory which is called operating memory. This communication system requires a separate memory (exchange memory) and a separate control unit (exchange control unit) for the exchange operation.

OBJECTS AND SUMMARY OF THE INVENTION

It is an object of the invention to provide a communication system which has less circuitry for exchanging software in a terminal unit.

The object is achieved with a communication system of the type defined in the opening paragraph in that the software comprises at least two blocks which are stored each in a respective memory and one block of which contains specific functions for an exchange operation, and in that, during an exchange operation, the control circuit is first provided for replacing the block without the specific functions by a new version of the block with the specific functions.

In the communication system according to the invention, the control circuit in the terminal unit carries out the exchange operation of the software which is divided into two blocks and stored in at least two memories. First a new version of the block is stored in a memory which new version has specific functions for the exchange operation. A new version of a block is understood to mean a software block produced by the station, which block is either or not changed compared with the previous version. Such specific functions are delete and store functions which are necessary for exchanging blocks in the memories. The block without specific functions contained in the memory is deleted first. Then the control circuit replaces the old version of the block with the specific functions by a new version of the block without the specific functions. The exchange operation does not need the use of a separate memory, but the working memory (buffer memory) of the control circuit is used which is arranged, for example, as a microprocessor system. Neither is any further control unit used for the exchange, but the control circuit is used that also carries out the normal operating functions. A disturbance (for example, power failure) may occur while an exchange is being carried out. If new rudimentary software has been transmitted, for example, during the period of power failure, which rudimentary software is necessary for the basic functions of the control circuit and is read from a specific memory by the control circuit after the system has started to operate, the terminal unit can no longer be operated because the rudimentary software is no longer available in that specific memory. To facilitate making the device operative even after a disturbance, the control circuit does not erase the memory area of a memory during the exchange operation, which memory area contains rudimentary software for executing basic functions of the control circuit.

An exchange operation may be started by a control center which is coupled to the terminal unit and the station over a network. Once a connection has been set up with the terminal unit and the station, the control center transmits an exchange command. Then, after a first connection has been set up, the station starts successively sending segments of a first block to the terminal unit. The terminal unit transmits the segments to a first memory after the segments of the first block have been received in a buffer memory of the control circuit. After all the segments of the first block have been transmitted and a disconnection has taken place, the control circuit sets up a second connection to the station and receives segments of a second block from the station. The terminal unit transmits the segments to a second memory after the segments of the second block have been received in a buffer memory of the control circuit. The control circuit then erases the first or second memory after the first segment of the first or second block has been stored in the buffer memory.

These and other aspects of the invention will be apparent from and elucidated with reference to the embodiments described hereinafter.

DETAILED DESCRIPTION OF THE PREFERRED EMBODIMENT

Figure 1:
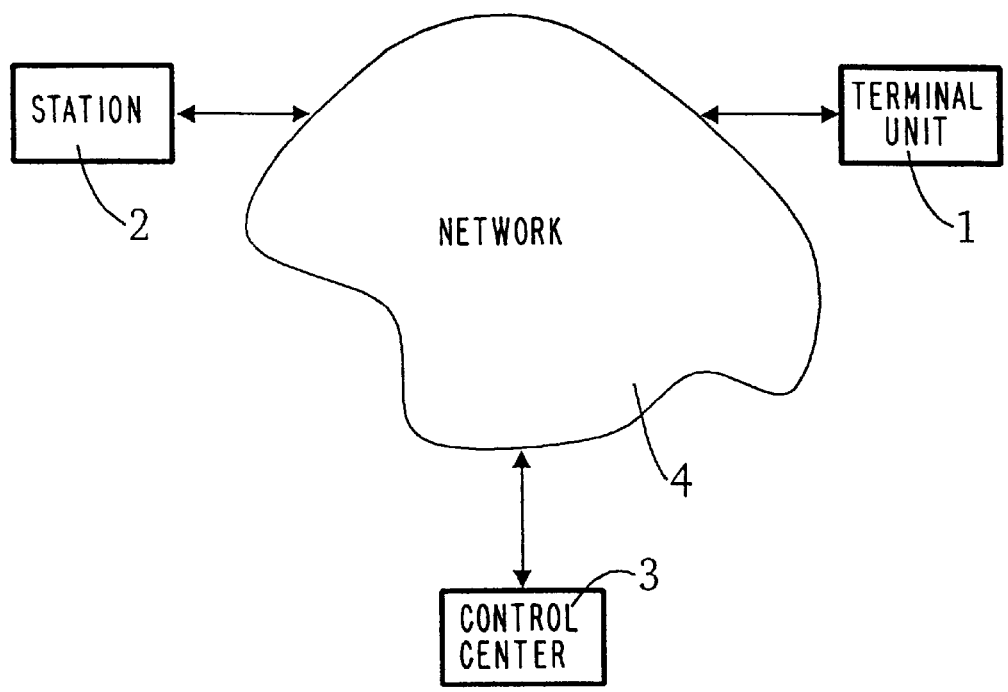
FIG. 1 gives a diagrammatic representation of a communication system comprising two terminal units and one control center.
Figure 2:
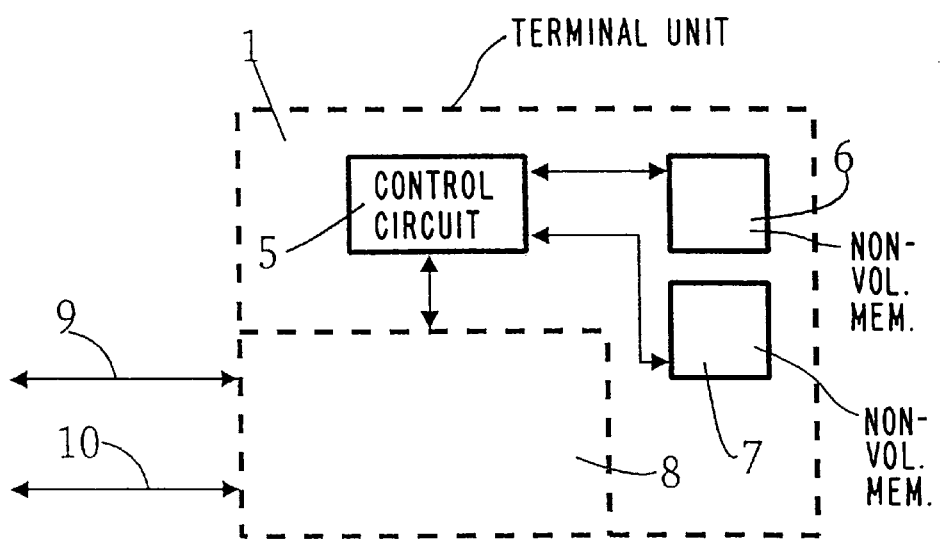
FIG. 2 shows a block circuit diagram of a terminal unit.

FIG. 1 diagrammatically shows a communication system comprising a terminal unit 1, a station 2 for supplying software and a control center 3. The terminal unit 1, the station 2 and the control center 3 are coupled to the network 4 outlined diagrammatically, which is, for example, an integrated services digital network (ISDN). Such a terminal unit 1 may be, for example, a terminal adapter for adapting an ISDN $S_O$ interface to an a/b interface. The station 2 may be a transmission unit of a terminal unit or, which is presupposed in the following, a terminal unit itself.

The terminal unit 1 comprises a control circuit 5, for example, a microprocessor, for controlling all the operations in the terminal unit 1, two non-volatile memories 6 and 7 which may be, for example, flash EPROMs for restoring the stored data even in the switched-off state of the terminal 1, and a switching element 8 which will not be described any further and performs, for example, the interface function of the terminal unit arranged as a terminal adapter. Two software blocks having the same or different version numbers are stored in each non-volatile memory 6 and 7. The software is necessary for operating the terminal unit 1. After the control circuit 5 has been switched on or reset, it always reads the software from the first memory 6 first. In this memory 6 is also available a software portion (rudimentary software) which is first read by the control circuit 5 and is provided for executing basic functions of the terminal unit 1. The terminal unit 2 has an identical structure.

The control center 3 has for its function to induce a software exchange in the terminal unit 1. The software is supplied by the station or the terminal unit 2. For this purpose, the terminal unit 1 and the station 2 are moved to an exchange state after an exchange command has been transmitted by the control center 3. Alternatively, the terminal unit 1 and also the station 2 may be moved to the exchange state as a result of a command given locally. In the following, the terminal unit 1 is referenced receiver and the station 2 transmitter.

The software for the terminal unit 1 or the receiver comprises two equally large blocks A and B which have each a version number and are stored in the memories 6 and 7 arranged as flash EPROMs. While the software is being exchanged, two connections are set up consecutively to renew the blocks A and B. Only at the beginning and at the end is available software in blocks A and B which have the same version number.

Figure 3:
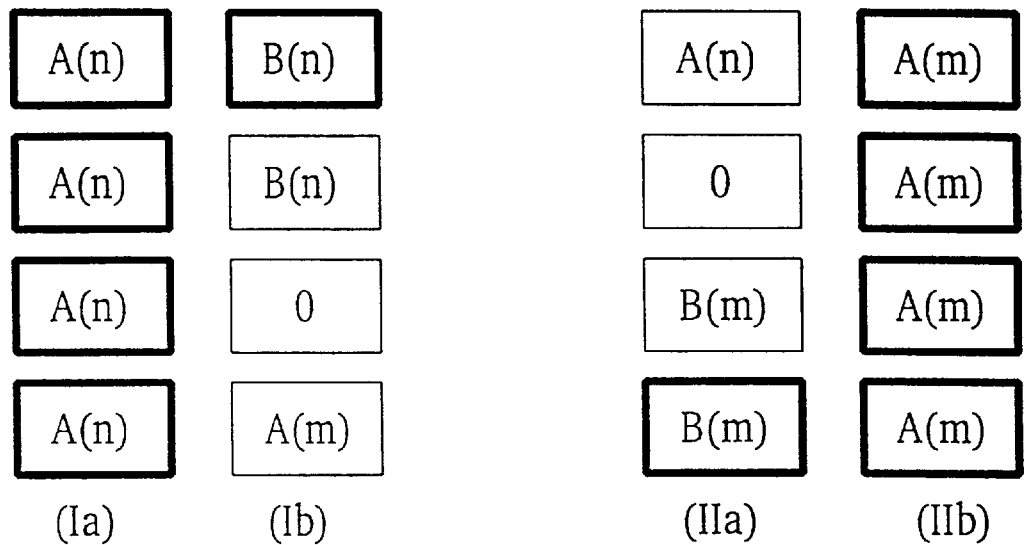
FIGS. 3 and 4 show blocks in explanation of the software exchange operation in the terminal unit.

The coarse routine of the exchange will be explained with reference to FIGS. 3 and 4. The blocks referenced (Ia), (IIa), (IIIa) and (IVa) show the contents of the memory 6 during various stages of the software exchange. The blocks referenced (Ib), (IIb), (IIIb) and (IVb) relate to different stages of the memory 7 during the software exchange. First the blocks referenced (Ia) and (Ib) in FIG. 3 are considered. There can be recognized that memory 6 contains a block A having version number n and memory 7 contains a block B also having version number n. Once the renewal of the software has been started, only block A is used. After the connection has been set up, the data of a block A having version number m are transmitted and the data are stored in the previously erased memory 7. Memory 6 then contains a block A having the version number n and memory 7 a block A having the version number m. Subsequently, the connection is cleared and a reset is carried out. The software recognizes that a block B is still to be transmitted. The next stages of the software exchange are shown diagrammatically by the blocks referenced (IIa) and (IIb) in FIG. 3. The software recognizes that only block A having version number m can be used. The exchange is terminated after the connection set-up, erasure of the memory 6 and programming of the memory 6 with the data of the transmitted block B having the version number m.

Figure 4:
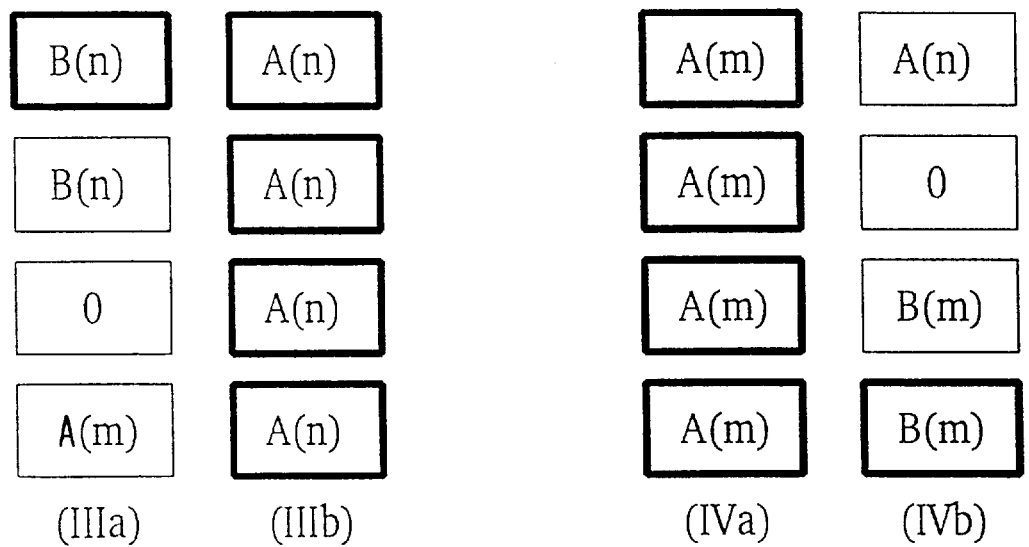

FIG. 4 shows the complementary exchange operation. At the beginning, memory 6 stores the block B having the version number n (IIIa) and at the end of the exchange operation the block A having the version number m (IVa). The memory 7 first contains the block A having the version number n (IIIb) and at last the block B having the version number m (IVb). Then, first the block B having version number n is replaced by block A having the version number m.

The described coarse operation has made apparent that always a block A that can run is to be available because this block A exclusively contains the functions of erasing and programming memories 6 and 7. If the exchange operation is interrupted, the terminal unit 1 or the receiver is reset. For a reset to be possible again after the exchange has been aborted, each software block A and B contains the rudimentary software discussed above. After an abortion and the subsequent reset, first the control circuit 5 loads the rudimentary software contained in the memory 6 and then extracts the erase and programming function from the complete block A.

In the following, a more accurate operational sequence description is given of the exchange operation. The control center 3 sends the exchange command to the transmitter after the connection has been set up. The control circuit 5 of the transmitter then sets the mark "SWDL_TRA" and is ready for transmitting the software. A reset is then carried out by the transmitter. The receiver is also invoked by the control center 3. Once the connection has been set up, the control center 3 sends the receiver the exchange command, the call number of the transmitter and the software version number to be transmitted. The control circuit S of the receiver sets the mark "SWDL_REC" and performs a reset.

After a reset, the control circuit 5 of the receiver recognizes the mark "SWDL_REC" and attempts to set up a connection to the transmitter. The control circuit 5 of the transmitter recognizes the mark "SWDL_TRA" after the reset and accepts the call of the receiver. After a successful connection set-up, the control circuit 5 of the receiver requests the transmitter for a first block carrying the version number stated by the control center 3 by a request command. After the request command has been received, the transmitter switches the version number of the stored software while being controlled by its control circuit 5. Upon reception, the control circuit 5 of the receiver compares the version number stated by the control center 3 with the version number supplied by the transmitter.

If the comparison proves that the version numbers do not tally, the receiver sends the message "FFF2" to the receiver. This message indicates that the software carrying the version number is not necessary. The receiver disconnects, deletes the mark "SWDL_REC" and carries out a reset. The transmitter receives the message "FFF2" and the disconnection command. The control circuit 5 of the transmitter keeps the mark "SWDL_TRA" set and does not carry out a reset.

When the version numbers match, the control circuit 5 of the receiver transmits the command "FFF0" to the transmitter and thus requests the transmitter to transmit the block. The blocks A and B of the software are subdivided into segments. Once the control circuit 5 has received the command "FFF0" from the transmitter, a first segment is transmitted to the receiver. The first segment arriving at the receiver is stored in a buffer which forms part of the control circuit 5 of the receiver. Subsequently, the control circuit 5 of the receiver transmits an acknowledgement to the control circuit 5 of the transmitter. This operation of transmitting segments from the transmitter to the receiver is continued with further segments until the buffer in the control circuit 5 of the receiver is filled. Once the buffer has been filled with segments of the first block, the contents of a first memory (6 or 7) of the control circuit 5 of the receiver are deleted in a next step.

If the control circuit 5 of the receiver detects an error when the first memory is erased, this control circuit sends the error message "FFFE" to the transmitter. The receiver disconnects and resets. The transmitter receives the message "FFFE" and the disconnection command. The control circuit 5 of the transmitter leaves the mark "SWDL_TRA" set and does not reset the transmitter. Subsequently, again a connection between transmitter and receiver is set up and the transmission of the version numbers and of the segments of the first block is repeated.

If the first memory has been successfully erased, the segments available in the buffer are written in the first memory (programming of the memory). If a transmission or memory error then occurs, the same operation is carried out as for an erase error.

If the first segments have successfully been transmitted from the buffer of the control circuit 5 to the first memory, the control circuit 5 of the receiver requests the control circuit 5 of the transmitter for further segments. The transmitter then consecutively switches segments of the block A in ascending order to the receiver. This means that, for example, the segments 11, 12, . . . , 19 and 20 are transmitted in sequence if the segments 1 to 10 have been sent in a first step. The segments are stored in the buffer and an acknowledgement is sent to the transmitter after the buffer is full. Then the segments are transmitted to the first memory.

An analogous operation is carried out for the remaining segments of the first block. Once the last segment has been stored in the first memory, the receiver sends a ready message "FFF1" to the transmitter, disconnects and resets. After the reset, the receiver recognizes the set mark "SWDL_REC" and sets up a new connection to the transmitter. After the connection set-up, the operation described above for the first block is also carried out for the second block of the software. The segments of the second block, however, are written in the second memory (7 or 6). Once the two blocks have been transmitted, the receiver sends a success message to the control center 3 if the latter has caused this exchange.

If the connection is interrupted while software is being exchanged, the receiver is reset and the software exchange is started with the first block if the segments have not been transmitted in full. Otherwise, the transmission of the second block is started with.

If during the transmission of the rudimentary software for the memory 6 the connection has been disrupted (for example, power failure), the terminal unit 2 cannot be taken into operation again. For this purpose, the routine described above may be changed, so that an exchange of the rudimentary software is excluded.

What is claimed is:

1. A communication system comprising a terminal unit which includes a control circuit and at least two memories for storing at least first and second software blocks, each of the first and second software blocks in a different one of the at least two memories, and comprising a station for supplying new version first and second software blocks contained in at least one memory of the station to the terminal unit, the first software block containing specific functions for use by the control circuit during an exchange operation for replacing currently stored first and second software blocks with new version first and second software blocks, wherein prior to each exchange operation the currently stored first software block is stored in only one of the at least two memories and is the only software block stored in the terminal unit containing said certain specific functions, the station having a control circuit which is configured for controlling transmitting new version first and second software blocks to the terminal during an exchange operation in response to an exchange command, and the control circuit of the terminal unit being configured for, during the exchange operation:
   first replacing the second software block stored in a first of the at least two memories by a received new version first software block using the specific functions in the first software block stored in a second of the at least two memories; and
   thereafter second replacing the first software block stored in a second of the at least two memories by a received new version second software block using the specific functions in the new version first software block now stored in the first of the at least two memories.

2. A communication system as claimed in claim 1, wherein the first software block contains specific functions for an erase or store operation.

3. A communication system as claimed in claim 1, wherein the control circuit of the terminal unit is configured for not erasing an area of a memory of the terminal unit which contains rudimentary software for carrying out basic functions of the control circuit of the terminal unit.

4. A communication system as claimed in claim 1, further comprising a control center which is coupled to the terminal unit and the station via a network and is provided for sending an exchange command after a connection has been set up with the terminal unit and the station.

5. A communication system as claimed in claim 1, wherein the control circuit of the station is configured for controlling sending consecutive segments of a new version first software block to the terminal unit after a first connection has been set up, and the control circuit of the terminal unit is configured for controlling:
   receiving the segments of the new version first software block in a buffer of the control circuit of the terminal unit;
   transferring the segments of the first software block from the buffer to the first of the at least two memories;
   setting up a second connection to the station after the transmission of all the segments of the first block and a disconnection;
   receiving in the buffer segments of the second software block from the station; and
   transferring the received segments from the buffer to the second of the at least two memories.

6. The communication system as claimed in claim 5, wherein the control circuit of the terminal unit is configured for erasing the first of the at least two memories after a first of the segments of the first software block has been received in the buffer, and for erasing the second of the at least two memories after a first of the segments of the second software block has been received in the buffer.

7. A communication system as claimed in claim 1, characterized in that each of the at least two memories is a flash-EPROM.

8. A communication terminal unit which includes a control circuit and at least two memories for storing at least first and second software blocks, each of the first and second software blocks in a different one of the at least two memories, the first software block containing specific functions for use by the control circuit during an exchange operation for replacing initially stored first and second software blocks with new version first and second software blocks, wherein prior to each exchange operation the currently stored first software block is stored in only one of the at least two memories and is the only software block stored in the terminal unit containing said specific functions, and the control circuit is configured for, during an exchange operation, controlling:
   receiving from a station of a communication system a new version first software block and a new version second software block;
   first replacing the initially stored second software block in a first of the at least two memories by the received new version first software block using the specific functions in the initially stored first software block; and
   thereafter second replacing the initially stored first software block in a second of the at least two memories with the received new version second software block using the specific functions in the new version first software block now stored in the first of the at least two memories.

9. A communication terminal unit as claimed in claim 8, wherein the first software block contains specific functions for an erase or store operation.

10. A communication terminal unit as claimed in claim 8, wherein the new version first software block and the new version second software block are each comprised by consecutive segments, and the control circuit is configured for controlling receiving the segments of the new version first software block from the station during a first connection and storing the received segments in a buffer, transferring the received segments of the new version first software block from the buffer to the first of the at least two memories, and after a disconnection, setting up a second connection to the station, receiving segments of the new version second software block from the station during the second connection and storing the received segments in the buffer, and transferring the received segments of the new version second software block from the buffer to the second of the at least two memories.

11. A communication terminal unit as claimed in claim 10, wherein the control circuit is configured for erasing the first of the at least two memories after the first of the segments of the first software block has been stored in the buffer, and for erasing the second of the at least two memories after the first of the segments of the second software software block has been stored in the buffer.

12. A communication terminal unit as claimed in claim 8, wherein each of the at least two memories is a flash-EPROM.

13. A method of controlling an exchange operation for exchanging first and second software blocks initially stored in first and second memories of a communications terminal unit, respectively, with new version first and second software blocks, the initially stored and new version first software blocks each containing specific functions for use by the control method during the exchange operation, wherein prior to each exchange operation the currently stored first software block is stored in only one of the at least two memories and is the only software block stored in the terminal unit containing said specific functions, and the control method comprises:

receiving from a station of a communication system a new version first software block and a new version second software block from a station;

first replacing the initially stored second software block in a first of the at least two memories by the received new version first software block using the specific functions in the initially stored first software block; and thereafter second replacing the initially stored first software block in a second of the at least two memories with the received new version second software block using the specific functions in the new version first software block now stored in the first of the at least two memories.

14. A method as claimed in claim 13, wherein the new version first software block and the new version second software block are each comprised by consecutive segments, and the receiving, the first replacing, and the second replacing are such that the segments of the new version first software block are received from the station during a first connection, stored in a buffer, and transferred from the buffer to the first of the at least two memories, and after a disconnection and a setting up of a second connection to the station, the segments of the new version second software block are received from the station during the second connections stored in the buffer, and transferred from the buffer to the second of the at least two memories.

* * * * *